United States Patent [19]

Simmons

[11] 4,328,660
[45] May 11, 1982

[54] GRAPEVINE SUCKERING TOOL

[76] Inventor: Neil J. Simmons, R.D. #5, Culver Rd., Penn Yan, N.Y. 14527

[21] Appl. No.: 193,076

[22] Filed: Oct. 2, 1980

[51] Int. Cl.³ .............................................. A01D 50/00
[52] U.S. Cl. ........................................ 56/12.7; 56/233
[58] Field of Search ................... 56/10.4, 11.9, 12.7, 56/29, 233–238, 17.1, 15.5

[56] References Cited

U.S. PATENT DOCUMENTS

| | | | |
|---|---|---|---|
| 2,549,043 | 4/1951 | Arthur | 51/334 |
| 3,444,674 | 5/1969 | Huff et al. | 56/12.7 |
| 3,670,481 | 6/1972 | Minet | 56/12.7 |
| 3,783,592 | 1/1974 | Schraut | 56/2 |
| 3,869,833 | 3/1975 | Belanger | 51/334 |
| 4,064,679 | 12/1977 | Spinner | 56/2 |
| 4,077,190 | 3/1978 | Crites | 56/12.7 |
| 4,103,474 | 8/1978 | Bylsma | 56/6 |
| 4,200,965 | 5/1980 | Roth | 51/334 |
| 4,206,580 | 6/1980 | Truax et al. | 56/11.9 |
| 4,206,585 | 6/1980 | Pollock | 56/235 |
| 4,257,213 | 3/1981 | Brumat | 56/237 |

FOREIGN PATENT DOCUMENTS

| | | | |
|---|---|---|---|
| 160385 | 5/1955 | Australia | 56/12.7 |
| 510217 | 7/1939 | United Kingdom | 56/12.7 |

*Primary Examiner*—Paul J. Hirsch
*Attorney, Agent, or Firm*—Stonebraker, Shepard & Stephens

[57] ABSTRACT

A grapevine suckering tool uses a rotor 10 having sucker flails 11 to remove suckers from the bases of a row of grapevines 12. The axis of rotor 10 is arranged within acute vertical and horizontal angles from the direction of the grapevine row. Sucker flails 11 are flexible straps each mounted on rotor 10 to have an outward extending length and a width oriented axially of rotor 10. As rotor 10 spins near the base of the grapevine row, flail straps 11 slap downward toward the vine base and drag over the ground knocking down, damaging, and breaking the suckers at the base of vine 12. Cylindrical sweeper brushes 32 can also be mounted on rotor 10 in place of flails 11 to sweep debris on the vineyard floor.

12 Claims, 7 Drawing Figures

GRAPEVINE SUCKERING TOOL

BACKGROUND

Grapevines grow suckers that consume energy otherwise available for producing fruit, and removing these suckers makes the grapevine healthier and more productive. Sucker removal has required walking along the grapevine rows, bending to reach the base of the vines, and manually pruning the suckers—a laborious and costly task.

Many people have tried to devise a labor saving machine that would mechanically remove suckers without damaging the main trunk of the grapevine, but this is a difficult problem because the suckers are tough and tenacious. Also, sucker removal should be selective so a sucker can be left to grow and eventually replace a vine that is damaged, diseased, or deformed.

I have found a solution to these problems in a grapevine suckering tool that applies the right amount of force in the right way to remove suckers quickly and efficiently under full control of an operator without harming the vines. My tool mounts on a vineyard tractor where it is powered and controlled by tractor hydraulics and allows a single person to sucker grapevines faster than several manual workers.

SUMMARY OF THE INVENTION

My grapevine suckering tool uses a rotor movable alongside grapevines in a row so the rotor axis is within acute vertical and horizontal angles from the direction of the row. Sucker flails formed as flexible straps are mounted on the rotor to have an outwardly extending length and a width oriented axially of the rotor. The rotor is made to spin as it passes by the base of a grapevine so the flails slap downward toward the vine base and drag over the ground at the vine base to knock down, damage, and break suckers from the vine. The rotor can also be used to sweep the vineyard floor by removing the flails and mounting cylindrical sweeper brushes. DRAWINGS FIG. 1 is a partially schematic, front elevational view of a preferred embodiment of my suckering tool working at the base of a grapevine;

DETAILED DESCRIPTION

My suckering tool removes grapevine suckers at the proper time during early summer when the suckers have developed enough to be broken down and torn away from the vine and are not yet sufficiently tough to resist removal. This eliminates suckers before they compete with the vine and allows substantially complete sucker removal.

Figure 1:
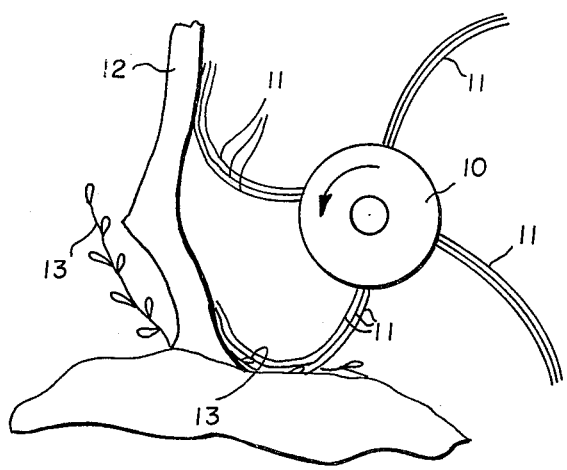
Figure 2:
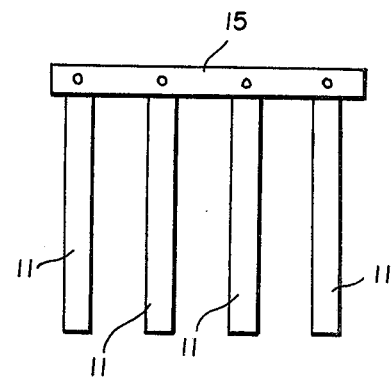
FIG. 2 is a partially schematic, side elevational view of sucker flail straps mounted on a bar for attachment to a rotor.

My suckering tool, as best shown in FIG. 1, removes suckers with flexible flails 11 mounted on and driven by a rotor 10. The rotor is arranged to move along near the bases of a row of grapevines 12, and the rotational axis of rotor 10 is arranged within acute vertical and horizontal angles from the direction of the grapevine row taken along the line 14 of FIG. 7 passing through the bases of vines 12. This sets the axis of rotor 10 approximately horizontal and within a few degrees from parallel with the grapevine row to orient flails 11 effectively for sucker removal.

Flails 11 are flexible straps having a length extending outward from rotor 10 and a width oriented axially of rotor 10. This makes flail straps 11 slap downward along the main trunk of grapevine 12 toward the base of the grapevine as rotor 10 is turned in the direction of the arrow while passing by the base of the vine. Rotor 10 is close enough to the ground so that flail straps 11 slap down all the way to the base of vine 12 to knock down, bend over, and break off suckers 13 that grow upward from the grapevine base and also to drag along the ground at the base of the grapevine in a high friction scrubbing motion that strips off sucker leaves, damages sucker bark, and tears away suckers that have been bent or broken downward. The frictional pulling force that the flexible flails apply to the suckers that are bent down to the ground is highly effective in damaging, breaking off, and tearing away suckers; and flail straps 11 make effective use of their frictional dragging force along the ground to remove suckers 13.

To make flails 11 work at their best requires several circumstances. The flails themselves must be tough and resilient and able to withstand many hours of slapping downward at the base of grapevines and dragging along the ground. I prefer flails formed of rubber as flat straps about 1 to 1½ inches wide and ¼ inch thick and 10 to 20 inches long, but other materials and dimensions may also work well. Rubber straps also have a high friction surface that works well in dragging over suckers 13 that have been bent down against the ground for damaging and breaking the suckers away. Even suckers that are not completely broken off from the base of vine 12 are usually stripped of leaves and bark and sufficiently damaged to prevent further growth.

Flat rubber straps slapping downward toward the base of the grapevine can remove suckers 13 without injuring the main trunk of the vine. Their rotational sweep positions straps 11 to attack the suckers from above and quickly bend or knock them down to the ground where the dragging force of the straps can break them away from the vine. The main trunk of the vine, however, is stronger, tougher, better protected with bark, and secured above the sweep of the straps so that the downward slapping straps do not damage vine 12.

The force applied by flails 11 is also selective and under control of an operator as explained below so that gentle and brief slapping can be applied for removing small suckers from a fragile vine and more vigorous slapping can be used for tougher suckers on a stouter vine. The sensitive control and selectivity available to the operator in rotating flails 11 against a vine, coupled with the ability of flails 11 to destroy suckers without harming the vine, make the tool fast and effective.

There are many ways that flails 11 can be mounted on rotor 10, and a simple arrangement that I prefer is bolting flails 11 to axial bars 14 that are spaced radially around rotor 10. Four rows of flails 11 with six to ten flails in each row are adequate. The flail straps extend radially outward from rotor 10 as illustrated, and making straps 11 thicker or braced at their anchored ends is desirable because that is where they are most likely to break.

Figure 3:
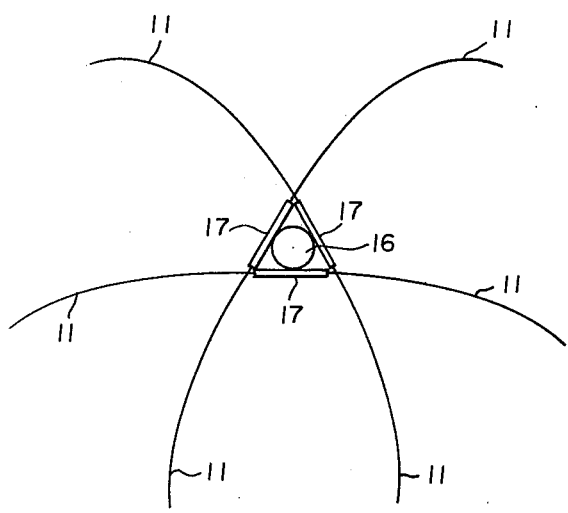
FIGS. 3 and 4 are schematic, front elevational views of alternative mountings for sucker flails on a rotor.
Figure 4:
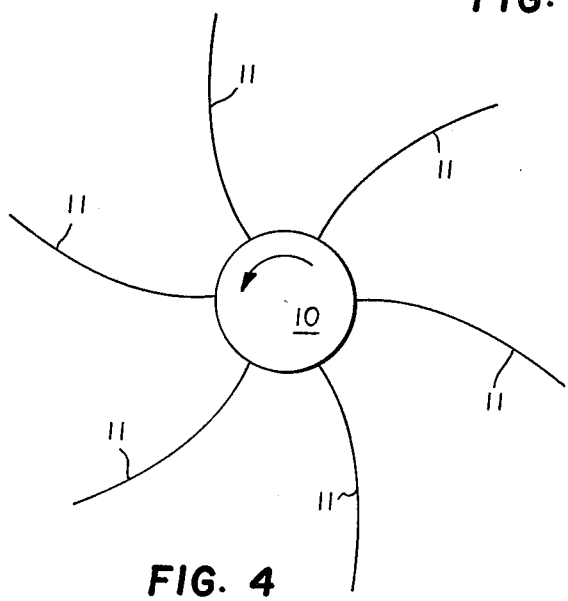

FIGS. 3 and 4 show alternative mounts for flails 11 to illustrate other possibilities. As shown in FIG. 3, a rotating shaft 16 carries axially spaced clamps 17 that hold midsections of flail straps 11 that extend flexibly outward to free ends. The centrifugal force from rotation of shaft 16 makes flails 11 whirl radially outward to exert a downward slapping motion against the base of a grapevine as explained above.

FIG. 4 schematically shows rotor 10 with six peripheral mounts supporting flails 11 at an angle between the radius and the tangent. Such a mounting angle accommodates a swept back orientation for flails 11, which tend to fly outward from centrifugal force when rotating freely and to be bent back to pull in direct tension against their mounting when slapping against suckers and dragging along the ground.

The strap mountings of FIGS. 1–4 illustrate a few of a multitude of possibilities. Rotors, strap mounting clamps or bolts, mounting angles, strap dimensions, and strap materials can vary widely within a workable range. The point is to form and anchor the straps on the rotor so they have a long wear life and are oriented to slap downward effectively at suckers 13 at the base of a grapevine.

Figure 7:
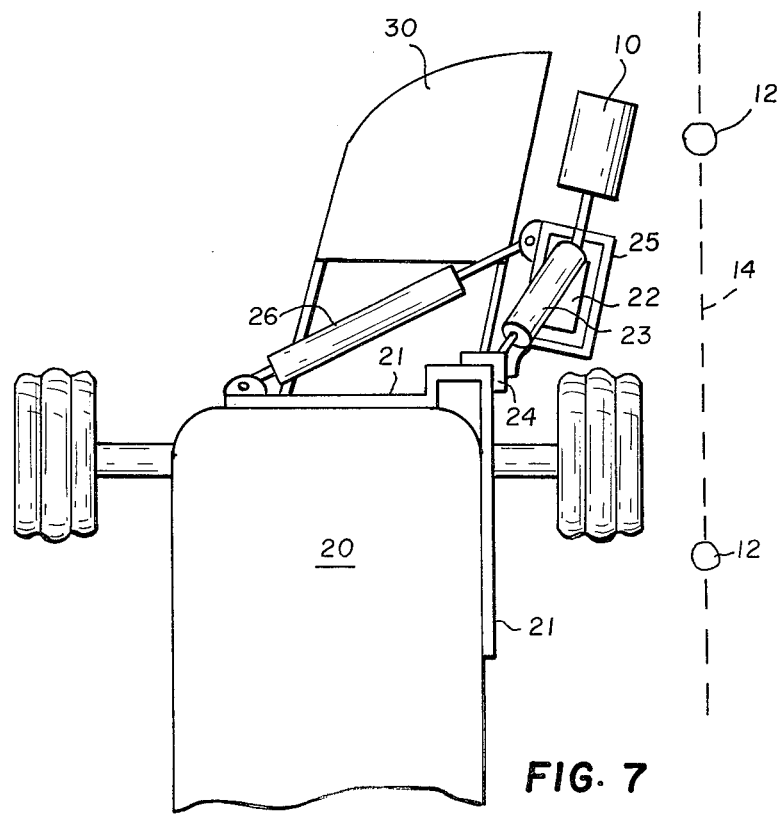
FIG. 7 is a partially schematic, fragmentary plan view of the tool and tractor mount of FIG. 6.

Rotor 10 must be oriented properly so that its rotation can make flails 11 work well. I prefer orienting the axis of rotor 10 at an elevation a few inches above the bases of grapevines 12 along row line 14 and inclined laterally toward row line 14 by a small acute angle as best shown in FIG. 7. This disposes the leading end of rotor 10 a little closer to the grapevines that the trailing end and orients flails 11 to slap downward at a slightly oblique angle to the direction of movement along the grapevine row. I find this gives the operator more selective control and is highly effective in removing suckers.

The best way to mount and operate my suckering tool is on a vineyard tractor 20. The tractor typically has a hydraulic system that can power and control the suckering tool, and tractor 20 also affords a convenient way for the operator to move the tool along the grapevine row and view and control its operation.

Figure 6:
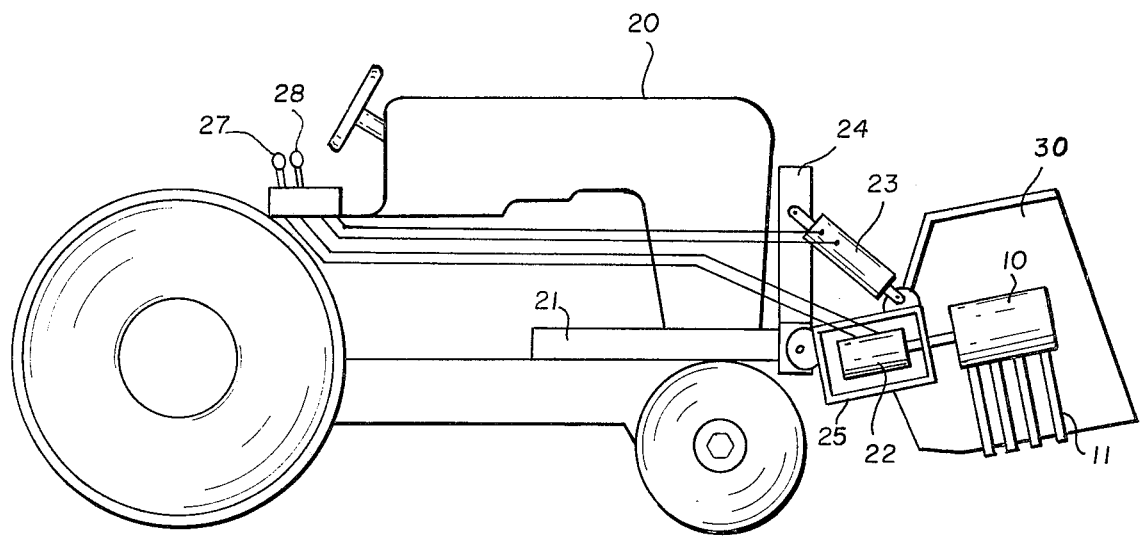
FIG. 6 is a partially schematic, side elevational view of a preferred embodiment of my suckering tool mounted on a vineyard tractor for hydraulic operation.

I prefer mounting the suckering tool on a bracket 21 bolted to the front right corner of vineyard tractor 20 to dispose rotor 10 along the right side of tractor 20 forward of the operator and within view of the operator as illustrated in FIGS. 6 and 7. Mounting rotor 10 forward of the front wheel of a vineyard tractor works well, but rotor 10 might be made to work from a mount between the front and back wheels of the tractor. When mounted forward of the front wheel as illustrated, rotor 10 can be moved closely alongside a row of grapevines by steering the tractor next to the row.

I prefer operating rotor 10 with the hydraulic system of vineyard tractor 20. A hydraulic motor 22 controlled by a lever 27 can turn rotor 10 in either direction whenever desired and to the extent desired by the tractor operator as rotor 10 moves along the grapevine row. This is fast and responsive to the operator's touch and allows the operator to apply the right amount of force for removing different suckers from different vines along the row.

The responsiveness of rotor 10 to the hydraulic control of the operator makes my suckering tool sensitive, selective, and more efficient. Rotation can be a few turns for a few flail slaps or many turns for as many flail slaps as possible as the rotor passes a vine base. The rotation can also be timed accurately as the rotor passes by the grapevine base, and these variations offer the operator a quick and sensitive control. For example, a few turns of rotor 10 can be sufficient to remove weak suckers from a relatively small or fragile grapevine, and many turns can be applied to heavy sucker growth on a tougher and sturdier vine. A vine without suckers or a sucker to be spared can be passed by with no rotation of the suckering tool. The rotor can be turned as it approaches a vine and stopped when it reaches the vine to attack a sucker on the near side of the vine; and conversely, the rotor can pass almost beyond the vine before turning to attack a sucker on the far side of the vine.

Proper elevation of rotor 10 is also important so that flails 11 can attack suckers 13 from above but also slap down far enough to force the suckers to the ground where the straps drag over the suckers. I prefer hydraulic elevation adjustment using the hydraulics of tractor 20 under control of the operator. This allows raising the tool while traversing the headland at the ends of the rows, setting the tool at different heights for vines on uphill and downhill sides of tractor 20, and adjusting the tool for any changes in elevation between the tractor and the row as the suckering proceeds.

An easy way to accomplish hydraulic elevation control is with a double-acting hydraulic cylinder 23 mounted between a vertical bar 24 of tractor bracket 21 and a pivotally movable frame 25 supporting hydraulic motor 22 and rotor 10. Control lever 28 then affords the operator quick and accurate vertical adjustment of the suckering tool. Many alternatives are possible in brackets, mounts, and hydraulic controls.

The other preferred adjustment in the orientation of rotor 10 is its lateral inclination toward grapevine row 14 as shown in FIG. 7 and explained above. The small acute angle of inclination of rotor 10 toward grapevine row 14 can be set for working efficiency and need not be frequently changed, so I prefer a screw adjustment 26 extending between tractor bracket 21 and tool supporting frame 25. The lateral position of rotor 10 relative to the bases of grapevines 12 is established by steering tractor 20.

I also prefer a dust shield 30 positioned on the side of rotor 10 opposite grapevines 12 outside the sweep of flails 11 to reduce the amount of dust blowing about. Shield 30 is preferably lightweight and can be formed of fabric covering a frame mounted in many possible ways to the tractor bracket 21 or tool frame 25.

Complete sucker removal usually requires flailing along each side of each row; and yet this is much faster than manual sucker removal, because the tractor moves steadily along and suckering of each vine occurs quickly. My suckering tool has reduced the cost of suckering a vineyard to as little as one-quarter the cost of manual sucker removal.

It is desirable to remove pruned vine canes from the grapevine row to the space between the rows where this material can be worked into the soil. Leaving vine prunings in the row can encourage vine borers and diseases. My tool is also useful for sweeping prunings from the vine row into the space between the rows, and it allows this task to be accomplished more quickly and cheaply than with manual labor.

Figure 5:
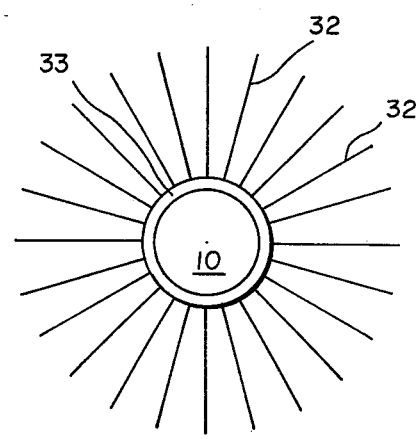
FIG. 5 is a partially schematic, front elevational view of the rotor of my suckering tool supporting a brush for sweeping the vineyard floor.

To convert rotor 10 to a vineyard floor sweeper, I remove flails 11 and use the generally cylindrical body of rotor 10 as a core for mounting cylindrical sweeper brushes. Street sweeping tools use disk-shaped brush elements with radial brush bristles 32 supported on central rings 33 with open centers that fit on rotor 10 as shown in FIG. 5. Several such brush elements secured on rotor 10 form a cylindrical sweeper brush suitable for sweeping the vineyard floor. The rotational and elevational controls described for removing suckers with rotor 10 also work well for holding brush 35 at the right elevation and rotating it in the right direction as it is steered along the vine row.

I claim:

1. A grapevine suckering tool comprising:
   a. a rotor;
   b. means for moving said rotor alongside grapevines in a row;
   c. the axis of said rotor being arranged within acute vertical and horizontal angles from the direction of said row;
   d. a plurality of sucker flails each formed as a flexible strap;
   e. means for mounting each of said sucker flails on said rotor so that said straps have an outward extending length and a width oriented axially of said rotor;
   f. said rotor and said flails being arranged so said rotor can spin as said rotor passes by the base of a grapevine to make said flails slap downward toward and against the base of said grapevine to attack suckers from above and to knock suckers down to the ground at the base of said grapevine; and
   g. said downward slapping flails being arranged to drag over the ground at the base of said grapevine in a high friction scrubbing motion for damaging and breaking away from said grapevine suckers that said flails have knocked to the ground at the base of said grapevine.

2. The tool of claim 1 wherein said sucker flails are formed of rubber.

3. The tool of claim 1 including means for mounting said rotor along the side of a tractor forward of the operator of said tractor and within the view of said operator so said tractor can be steered to move said rotor alongside said grapevine row, a hydraulic drive for rotating said rotor under control of said tractor operator, and hydraulic means for adjusting the elevation of said rotor under control of said tractor operator.

4. The tool of claim 3 including a dust shield arranged on the side of said rotor opposite said grapevine.

5. The tool of claim 3 including a cylindrical brush mountable on said rotor in place of said flails for sweeping the vineyard floor along said grapevine row.

6. The tool of claim 5 wherein said hydraulic drive is able to rotate said rotor for turning said brush in either direction.

7. The tool of claim 3 wherein said sucker flails are formed of rubber.

8. The tool of claim 3 including adjustment means for setting a lateral acute angle between said axis of said rotor and the longitudinal axis of said tractor.

9. The tool of claim 8 wherein said sucker flails are formed of rubber.

10. The tool of claim 9 including a dust shield arranged on the side of said rotor opposite said grapevine.

11. The tool of claim 10 including a cylindrical brush mountable on said rotor in place of said flails for sweeping the vineyard floor along said grapevine row.

12. The tool of claim 11 wherein said hydraulic drive is able to rotate said rotor for turning said brush in either direction.

* * * * *